Figure 1:
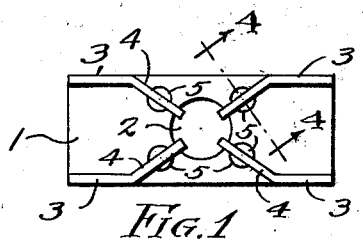

Nov. 11, 1947.  J. W. SIMMONS  2,430,831

FASTENER

Filed Oct. 10, 1944

Inventor
John W. Simmons
By Hull & West
Attorneys.

Patented Nov. 11, 1947

2,430,831

UNITED STATES PATENT OFFICE 2,430,831

FASTENER

John W. Simmons, Cleveland Heights, Ohio

Application October 10, 1944, Serial No. 557,996

6 Claims. (Cl. 85—32)

This invention relates to quick acting fasteners, and among its more general objects is that of providing a fastener of the above mentioned character that is extremely efficient; that is strong and durable and retains its effectiveness indefinitely; that is simple and economical of manufacture, that is convenient of application to an entering element, such, for example, as a screw of standard type.

These ends are attained by incorporating in the fastener a plurality of holding parts or jaws having element contacting edges that extend a substantial distance along the entering element in a direction longitudinally thereof and are spaced apart circumferentially of said element, said parts or jaws preferably being disposed radially of the element and having their element contacting edges serrated substantially complementary to the surface of a threaded entering element whereby they are rendered capable of multiple thread contact with the element. The fastener includes a flexible base by the end portions of which said holding parts or jaws are supported, and in the application of the fastener to an entering element said base may bend in order to facilitate quick projection of the fastener over and along the element to near its final position thereon, after which, by turning the element, the fastener is compressed and the base straightened out more or less to cause the holding parts or jaws to be forced into very firm contact, throughout the length of their element engaging edges, with the entering element.

Another object of the invention is to provide means for restraining the holding parts or jaws against lateral displacement, while permitting them to move toward and from the base during flexing of the latter.

It is a further object of my invention to enhance the holding power of the fastener—especially from loosening due to vibration—by incorporating in the fastener auxiliary holding parts or jaws of impressionable material, which material may consist of fiber, or of dead soft metal, or a composition including metal. These auxiliary holding parts or jaws may or may not be threaded for cooperation with a threaded entering element; and, when threaded, the threads are desirably shallow, as compared to those of the entering element, being mere indentations, so that when the fastener is applied to the element the threads of the latter cut their way into the impressionable material and thereby create a permanent binding effect between the element and said auxiliary jaws, this action, especially due to the pliability of the material, preventing the pressure of the auxiliary holding parts upon the element from being relaxed because of vibration to which the assembly including the fastener and entering element may be subjected.

A further object is to provide a simple construction for this composite fastener—i. e., the one including the auxiliary holding parts or jaws—that will facilitate production and assembly of the fastener and which, though simple, is very strong and durable.

Figure 2:
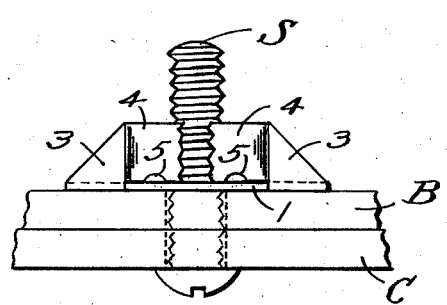
Figure 3:
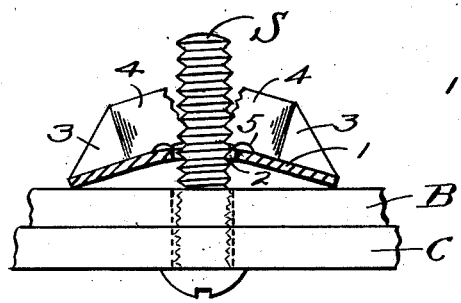
Figure 4:
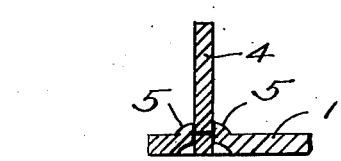
Figure 5:
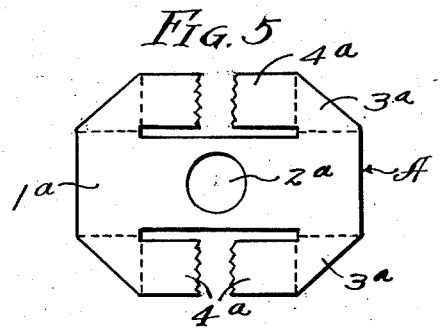
Figure 6:
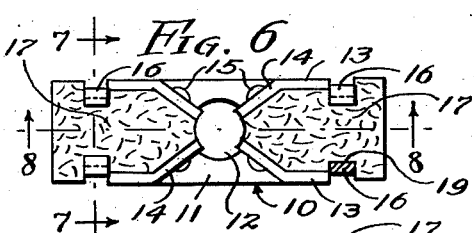
Figure 7:
Figure 8:
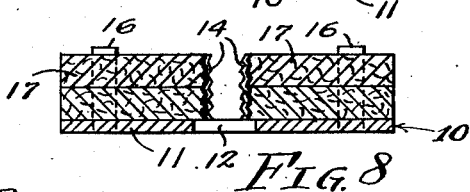
Figure 9:
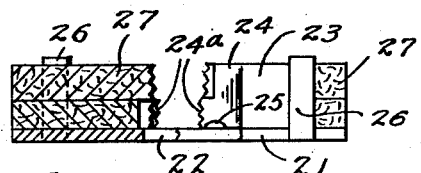

The foregoing objects, with others that will become evident during the course of the following description, are attained in the embodiments of the invention illustrated in the accompanying drawing wherein Fig. 1 is a plan view of a fastener constructed in accordance with the invention; Fig. 2 shows the fastener of Fig. 1 in side elevation and as applied to a screw by which two members are held together; Fig. 3 is a view somewhat similar to Fig. 2 but showing the fastener in longitudinal section and in the shape it assumes when first applied to the screw before the latter is turned to compress the fastener; Fig. 4 is an enlarged sectional detail on the line 4—4 of Fig. 1; Fig. 5 is a plan view of the blank from which the fastener shown in the preceding views is formed; Fig. 6 is a plan view of a composite fastener in which auxiliary holding parts or jaws of impressionable material are incorporated; Figs. 7 and 8 are sections on the respective lines 7—7 and 8—8 of Fig. 6, and Fig. 9 is a side elevation, partly in section, of a modified form of the composite fastener.

The fastener illustrated in Figs. 1 to 4 comprises a rectangular base 1 that is provided with a central aperture 2 for the passage of an entering element; side walls 3 that are located adjacent the ends of the base and are shown as triangular, and holding parts or jaws 4 that extend from the inner ends of said walls diagonally over the base and are disposed substantially radially of the axis of the aperture 2, the inner ends of said parts or jaws overhanging the aperture. The walls 3 and parts 4 are at right angles to the base 1 so that the inner or element-contacting edges of said parts or jaws are parallel to the axis of the aperture. Said edges are serrated, desirably complementary to the threads of an entering element with which the fastener is intended for use.

To prevent the holding parts or jaws 4 from being displaced laterally in either direction from their normal position when the fastener is engaged with an entering element, or when said element is turned with respect to the fastener, means are provided which serve this purpose while permitting limited relative movement between said parts or jaws and the base in a direction perpendicular to the base. Such means, in the present instance, consist of projections 5 that are struck from the base 1 and are displaced upwardly along the opposite sides of the jaws, as best illustrated in Fig. 4. In connection with this view, it may be well to explain that the cross hatched area below the two short horizontal lines that extend the width of the element 4 represent the portion of the base 1 intermediate the two projections 5 that are struck upwardly from the base, leaving the intermediate part of the base in its original plane. The lower edge of the element 4 is spaced very slightly above the top plane of the base, where said element reposes between the projections 5.

The blank from which the above described fastener is formed is shown in plan in Fig. 5 where it is designated generally by the reference letter A. This blank may be of ferrous or non-ferrous sheet metal, and the sections thereof from which the various elements of the finished fastener are formed are indicated by the same reference numerals as are applied to said elements in Figs. 1 to 4, augmented by the exponent *a*.

To illustrate a practical application of the invention I have shown, in Figs. 2 and 3, the fastener applied to a screw S that constitutes the entering element, and which is used to hold the members B and C together. The screw is projected through aligned holes in the members B and C, and the fastener is then applied to the protruding end of the screw and is forced along the same, preferably by applying pressure to the opposite ends of the base 1. As the holding parts or jaws 4 ride over the threads of the screw, the base may flex or bend as illustrated in Fig. 3. The fastener is pushed along the entering element until the ends of the base contact the member B. Thereafter, the screw may be turned by means of a screw driver in an appropriate direction to feed the holding parts or jaws 4 along the screw until the base 1 assumes or approaches the flat condition in which it is illustrated in Fig. 2 when the entire length of the element engaging edges of the holding parts or jaws 4 are in contact with the threads of the screw. To remove the fastener, the screw is rotated in a reverse direction relative to the fastener. During application or removal of the fastener, the projections 5 restrain the holding parts or jaws from lateral movement.

The composite fastener illustrated in Figs. 6 to 8 includes a unit, designated generally by the reference numeral 10, very much like the construction above described. It comprises a base 11 provided with a central aperture 12, side walls 13, and holding parts or jaws 14, the latter being held against lateral movement in one direction by projections 15. In this case the base is extended beyond the outer ends of the side walls and, immediately adjacent said walls, the base is provided with tongues 16.

Superposed upon the base between the ends thereof and the aperture 12 are auxiliary holding parts or jaws 17 that are made of fiber or other impressionable material, examples of which have been given above; and each of said auxiliary holding parts or jaws is shown as composed of two layers of said material. The inner ends of the parts or jaws 17 slightly overhang the sides of the aperture 12 in a position to contact the entering element when the same is projected through said aperture. The element contacting surfaces of the auxiliary holding parts or jaws 17 may be left smooth or they may be grooved transversely to any desired depth, preferably less than the depth of the threads of the entering element. The parts or jaws 17 are shown as of a shape to fit the space between the opposed walls 13 and parts 14, and immediately beyond the outer ends of the walls 13 the parts 17 are notched at 19 to receive the tongues 16, as best illustrated in the lower right hand corner of Fig. 6 where the tongue 16 is shown in section. The upper ends of the tongues 16 are bent over the parts 17 to firmly secure them to the base. Outwardly beyond the notches 19 that accommodate the tongues 16 the parts 17 correspond in size and shape with the base. While the previously mentioned projections 15 prevent spreading of the holding parts or jaws 14, inward movement thereof is blocked by the auxiliary holding parts or jaws 17.

The construction shown in Fig. 9 is identical with that illustrated in Figs. 6 to 8 with the exception of the element engaging ends of the holding parts or jaws. Here the base is designated 21, the aperture thereof 22, the side walls 23, and the holding parts that are turned diagonally inwardly from said walls are designated 24. The projections which prevent lateral outward movement of said holding parts may be the same as in the construction last described, the one shown being designated 25; and 26 are the tongues which clamp the auxiliary jaws 27 to the base 21. In the fastener at present under consideration, the element contacting ends of the holding parts 24 are cut away for substantially half their length from their ends remote from the base, the remaining portions of said ends being serrated, as indicated at 24$^a$. The inner ends of the auxiliary jaws 27 are cut away in reverse order to those of the holding parts 24 so as to provide voids within the zone of the serrated element contacting portions of said parts 24; and in the region of the cutaway portions of the last mentioned parts, the inner ends of the auxiliary jaws are designed and arranged for holding engagement with the entering element. This construction provides relative movement between the holding parts 24 and auxiliary jaws 27 in a direction axially of the entering element, thereby affording the jaws of impressionable material an opportunity to yield relative to the body portion of the fastener in case of severe vibration without said auxiliary jaws relaxing their constant pressure on the element.

In applying either of the composite forms of the invention to an entering element, the action is substantially the same as that above described with reference to the fastener illustrated in Figs. 1 to 4.

Obviously, the element contacting edges or faces of the holding parts or jaws, in all forms of the invention, may be of any appropriate length, greater or less than that shown in the drawing, according to the extent of contact desired between the holding parts or jaws and the entering element.

Having thus described my invention, what I claim is:

1. A fastener comprising a substantially parallel-sided oblong base having an aperture at its transverse center intermediate its ends, and two pairs of holding parts, each pair being contiguous to a respective side of the base and supported at their outer ends from said side of the base and converging over the base approximately radially of the axis of said aperture with their terminals overhanging the aperture.

2. A fastener according to claim 1 characterized by means rising from the base in spaced relation to said aperture for restraining the holding parts against lateral displacement.

3. A fastener comprising a substantially parallel-sided oblong base having an aperture at its transverse center intermediate its ends, walls rising from the opposite sides of the base adjacent the ends thereof, and two pairs of holding parts, the parts of each pair extending in converging relation from the adjacent ends of the walls that rise from a respective side of the base over the base approximately radially of the axis of said aperture with their terminals overhanging the aperture.

4. A fastener according to claim 3 characterized by projections on the base in spaced relation to said aperture for engaging and restraining the holding parts against lateral displacement.

5. A fastener comprising a rectangular base having a central aperture, walls rising from the sides of the base adjacent the ends thereof, and holding parts extending from the inner ends of said walls diagonally over the base approximately radially of the axis of said aperture with their terminals overhanging the aperture.

6. A fastener made of sheet metal and comprising a rectangular base having a central aperture, walls rising from the sides of the base adjacent the ends thereof, holding parts extending from the inner ends of the walls diagonally over the base approximately radially of the axis of said aperture with their terminals overhanging the aperture, and projections displaced from the base in spaced relation to said aperture and on opposite sides of each holding part for restraining said part against appreciable lateral movement.

JOHN W. SIMMONS.

REFERENCES CITED

The following references are of record in the file of this patent:

UNITED STATES PATENTS

| Number | Name | Date |
|---|---|---|
| 2,294,054 | Thompson | Aug. 25, 1942 |
| 2,294,056 | Thompson | Aug. 25, 1942 |
| 2,294,057 | Thompson | Aug. 25, 1942 |
| 2,392,704 | Simmons | Jan. 8, 1946 |